United States Patent Office 3,405,089
Patented Oct. 8, 1968

3,405,089
STABILIZED POLYALKYLENE OXIDES
Otto Mauz, Frankfurt am Main, and Horst Behrenbruch, Kelkheim, Taunus, Germany, assignors to Farbwerke Hoechst Aktiengesellschaft vormals Meister Lucius & Bruning, Frankfurt am Main, Germany, a corporation of Germany
No Drawing. Filed Apr. 5, 1965, Ser. No. 445,739
Claims priority, application Germany, Apr. 18, 1964, F 42,645
9 Claims. (Cl. 260—45.8)

ABSTRACT OF THE DISCLOSURE

Polyalkylene oxides stabilized by a mixture of (I) a benzotriazole, (II) a bisphenol methane or sulfide and (III) a bisaliphatic sulfide.

---

The present invention relates to stabilized polyalkylene oxides and a process for preparing them.

It is known that homo- and copolymers of alkylene oxides, like all polyethers, are more or less liable to degradation reactions under the action of light and atmospheric oxygen, and therefore, must be stabilized prior to being processed or used.

It has already been proposed to use aromatic amines or phenols as stabilizers, for example, for polypropylene oxide. However, stabilizers of this type are not effective enough to prevent degradation in the presence of light and/or at elevated temperatures.

Now we have found that a stabilizer system consisting of compounds of the formulae given below is excellent for stabilizing polyalkylene oxides against degradation under the action of light and/or at elevated temperatures.

The compounds forming the stabilizer system to be used in the process of the invention correspond to the following formulae:

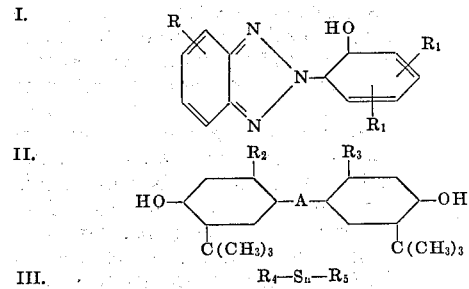

III. $R_4$—$S_n$—$R_5$ in which R represents a hydrogen atom, an alkyl radical with, for example, 1 to 12 carbon atoms, an alkoxy group, for example a methoxy group, or a halogen atom, $R_1$ represents a hydrogen atom or an alkyl radical with, for example, 1 to 12 carbon atoms, A represents the group —S— or —$CH_2$—, advantageously the group —S—, $R_2$ and $R_3$ stand for identical or different alkyl radicals having 1 to 4 carbon atoms, advantageously 1 carbon atom, $n$ is a whole number in the range of 1 to 4, and $R_4$ and $R_5$ are identical or different alkyl radicals with, for example, 4 to 30, advantageously 8 to 20, carbon atoms or the group —$(CH_2)_m$—$COOR_6$ in which group $R_6$ represents an alkyl radical with, for example, 4 to 30 carbon atoms and $m$ is a whole number in the range of 1 to 4. The stabilizer system generally contains 0.1 to 5% by weight of at least one compound of Formula I, 0.01 to 5% by weight of at least one compound of Formula II and 0.01 to 5% by weight of at least one compound Formula III, the percentage figures being calculated on the polymer.

Examples of compounds of Formula I are the following:

2(2'-hydroxy-phenyl)-benzotriazole
2(2'-hydroxy-5'-methyl-phenyl)-benzotriazole
2(2'-hydroxy-3',5'-dimethyl-phenyl)-benzotriazole
2(2'-hydroxy-3',5'-di-tert.butyl-phenyl)-benzotriazole
2(2'-hydroxy-3'-methyl-5'-tert.butyl-phenyl)-benzotriazole
2(2'-hydroxy-3'-methyl-5'-dodecyl-phenyl)-benzotriazole
2(2'-hydroxy-3',5'-dimethyl-phenyl)-5-methoxy-benzotriazole
2(2'-hydroxy-3',5'-di-tert.butyl-phenyl)-5-chloro-benzotriazole
2(2'-hydroxy-3'-methyl-5'-tert.butyl-phenyl)-5-bromo-benzotriazole Examples of the compounds of Formula II are the following:

Bis(4-hydroxy-2-methyl-5-tert.butyl-phenyl)methane
Bis(4-hydroxy-2-propyl-5-tert.butyl-phenyl)-methane
Bis(4-hydroxy-2,5-di-tert.butyl-phenyl)-methane
Bis(4-hydroxy-2-methyl-5-tert.butyl-phenyl)-sulfide
Bis(4-hydroxy-2-propyl-5-tert.butyl-phenyl)-sulfide
Bis(4-hydroxy-2,5-di-tert.butyl-phenyl)-sulfide.

As organic sulfur compounds of Formula III there may be used, for example, the following:

Di(dodecyl)sulfide, di(octadecyl)sulfide, di(dodecyl) disulfide, di(octadecyl)disulfide, di(dodecyl)trisulfide, di (octadecyl)trisulfide, di(dodecyl)tetrasulfide, di(octadecyl)tetrasulfide, thiodiglycolic acid dodecyl ester, thiodipropionic acid octadecyl ester, thiodibutyric acid dodecyl ester, trisulfide (diacetic acid octadecyl ester) and tetrasulfide (diacetic acid octadecyl ester).

The mixtures make suitable stabilizers for polyalkylene oxides. The term "polyalkylene oxides" is here intended to mean homo- and copolymers of alkylene oxides which have been obtained by polymerizing saturated alkylene oxides, for example, ethylene oxide and propylene oxide; substituted epoxides, for example, epichlorhydrin, perfluoropropylene oxide and 1 - chloro - 3,4 - epoxybutane; cycloaliphatic epoxides, for example cyclohexene oxide: epoxy ethers, for example methyl- and phenyl glycidyl ethers; or by copolymerization of saturated with unsaturated epoxides, for example, allylglycidyl ether, o-allyl-phenylglycidyl ether, glycidyl acrylate, vinylcyclohexene monoepoxide, cyclohexene oxide, butadiene monoxide, 1,2 - epoxyhexene - 5 and 1,2 - epoxy-cyclooctene - (5), in the presence of an ionic catalyst by a known process.

The above mentioned stabilizer mixtures are added to the polymer in solid form or in the form of a solution and then intimately mixed with the polymer. The stabilizer mixtures may also be used for stabilizing mixtures of polymers.

The polyalkylene oxides stabilized by the process of the invention may be used for many fields of application, for example, in the manufacture of shaped articles, films and fibers.

It is also possible to dissolve or swell the above mentioned homo- and copolymers in appropriate solvents or swelling agents. The solutions or swellings shall have a solid content of about 20 to 30%. Examples of suitable swelling agents or solvents are dimethyl formamide, tetramethylene sulfone, dioxane, methanol, benzene and other aromatic substances, chlorinated hydrocarbons, and double and triple mixtures of the said solvents or swelling agents.

To the solutions or swellings of the copolymers of saturated and unsaturated epoxides stabilized by the process of the invention, compounds having a cross-linking action may be added. Suitable cross-linking agents are, for example, sulfur-accelerator systems, organic peroxides or other substances forming free radicals under cross-linking conditions, for example, azoisobutyric acid dinitrile or azodicarboxylic acid diamide.

It is also possible to add to the solutions or swellings of the polymers stabilized in accordance with the invention a further substance, for example, active or inactive soots, light fillers, dyes or pigments, extending oils or lubricants.

The stability of the polyalkylene oxides stabilized by the process of the invention was examined as shown in the table given hereinafter.

The following example serves to illustrate the invention but it is not intended to limit it thereto, the parts being by weight.

Example

With the use of a copolymer of 92.5 mol percent of propylene oxide and 7.5 mol percent of allylglycidyl ether, a mixture having the following composition:

|  | Parts |
|---|---|
| Copolymer | 100.0 |
| Thiourea | 1.0 |
| Active silicic acid | 15.0 |
| Zinc oxide | 7.5 |
| Dipentamethylene thiuramtetrasulfide | 5.0 |
| 2-mercapto-benzothiazole | 0.75 |
| Titanium dioxide | 3.0 |
|  | 132.25 | was prepared on a roll mill at a temperature of the rolls of about 40° C.

100 parts of the mixture so obtained were dissolved in, or made into a paste with 400 parts of methanol, and a mixture consisting of 2% by weight of the compounds of Formula I indicated in the following table, 0.5% by weight of bis(4-hydroxy-5-tert.butyl-2-methyl-phenyl)sulfide and 0.5% by weight of di(octadecyl)disulfide as heat stabilizers was added.

With the use of water as the liquid for the precipitating bath, the solution or gel so obtained was spun under the following conditions and the filaments so obtained were subsequently cross-linked in a heated shaft:

| Spinning temperature | ° C | 20 |
|---|---|---|
| Conveying rate | g./min | 0.2 |
| Nozzle | μ | 6/300 |
| Titer | deniers | 6/200 |
| Temperature of precipitating bath | ° C | 20 |
| Time of stay in precipitating bath | seconds | 60 |
| Temperature of cross-linking | ° C | 160 |
| Time of cross-linking in heated shaft | seconds | 60 |
| Draw-off rate | m./min | 5 |
| After-vulcanization on bobbin sec./160° C. hot-air | | 120 |

The following table indicates the properties of the fibers after 80 hours of rapid exposing (Xenotest).

TABLE

|  | Without compound of Formula (I) | Compound of Formula (I) | |
|---|---|---|---|
|  |  | a<br>2[2'-hydroxy-3',5'-di(tert. butyl)-phenyl]-5-chloro-benzotriazole, percent | b<br>2(2'-hydroxy-5'-methyl-phenyl)-benzotriazole, percent |
| Relative residual tensile strength in percent of initial tensile strength after 80 hours of rapid exposing (Xenotest).* | Brittle, no longer measurable. | 38 | 29 |
| Relative residual elongation at break in percent of initial elongation at break after 80 hours of rapid exposing (Xenotest). | do | 55 | 40 |

*Temperature 45° C., relative atmospheric moisture 30%.

We claim:

1. A composition of matter comprising a polyalkylene oxide and a mixture consisting of 0.1 to 5% by weight, calculated on the polymer, of at least one compound of the following Formula I, 0.01 to 5% by weight, calculated on the polymer, of at least one compound of the following Formula II and 0.01 to 5% by weight, calculated on the polymer, of at least one compound of the following Formula III:

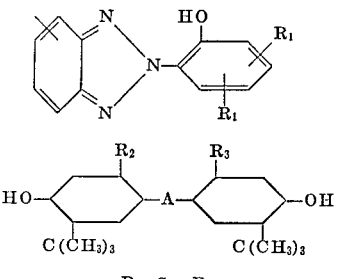

III.    $R_4-S_n-R_5$ in which R represents a member selected from the group consisting of hydrogen, an alkyl radical with 1 to 12 carbon atoms, an alkoxy group and a halogen atom, $R_1$ represents a member selected from the group consisting of hydrogen and an alkyl radical with 1 to 12 carbon atoms, A represents a member selected from the group consisting of the group —S— and the group —CH$_2$—, $R_2$ and $R_3$ represent alkyl radicals with 1 to 4 carbon atoms, $n$ is a whole number in the range of 1 to 4, and $R_4$ and $R_5$ represent a member selected from the group consisting of an alkyl radical with 4 to 30 carbon atoms and the group —(CH$_2$)$_m$COOR$_6$ in which group $R_6$ represents an alkyl radical with 4 to 30 carbon atoms and $m$ is a whole number in the range of 1 to 4.

2. The composition according to claim 1 wherein A stands for —S—.

3. The composition according to claim 1 wherein $R_2$ and $R_3$ stand for methyl.

4. The composition according to claim 1 wherein $R_4$ and $R_5$ stand for alkyl having 8 to 20 carbon atoms.

5. The composition according to claim 1 wherein $R_4$ and $R_5$ stand for —(CH$_2$)$_m$COOR$_6$ wherein $R_6$ is alkyl having 4 to 30 carbon atoms and $m$ is a whole number from 1 to 4.

6. The composition according to claim 1 wherein the compound of Formula I is 2[2'-hydroxyl-3',5-di-(tert. butyl)-phenyl]-5-chlorbenzotriazole.

7. The composition according to claim 1 wherein the compound of Formula I is 2-(2'-hydroxyl-5'-methylphenyl)-benzotriazole.

8. The composition according to claim 1 wherein the compound of Formula II is bis-(4-hydroxy-5-tert.-butyl-2-methylphenyl)-sulfide.

9. The composition according to claim 1 wherein the compound of Formula III is di-(octadecyl)-disulfide.

References Cited

UNITED STATES PATENTS

| | | | |
|---|---|---|---|
| 2,871,219 | 1/1959 | Baggett et al. | 260—45.95 |
| 3,219,623 | 11/1965 | Berardinelli | 260—45.95 |
| 3,235,624 | 2/1966 | Green | 260—45.9 XR |
| 3,277,044 | 10/1966 | Weissermel et al. | 260—45.8 |
| 3,325,547 | 6/1967 | Cour et al. | 260—611.5 |
| 3,326,849 | 6/1967 | Kelly et al. | 260—45.8 |

DONALD E. CZAJA, *Primary Examiner.*

M. J. WELSH, *Assistant Examiner.*